United States Patent [19]
Dushku

[11] 3,945,065
[45] Mar. 23, 1976

[54] LUMBERING TOOL

[76] Inventor: Victor A. Dushku, Borden Studenstaden No. 2, 75233 Uppsala, Sweden

[22] Filed: June 30, 1975

[21] Appl. No.: 591,412

[52] U.S. Cl. .................. 7/14.3; 254/131; 294/26
[51] Int. Cl.² .................. B25F 1/00; B66F 15/00
[58] Field of Search ......... 7/1 F, 14.3, 12; 254/103, 254/131; 294/26; 81/3 R

[56] References Cited
UNITED STATES PATENTS

| 138,055 | 4/1873 | Tamplin | 7/14.3 |
|---|---|---|---|
| 589,739 | 9/1897 | Miller | 7/14.3 |
| 676,961 | 6/1901 | Parks | 7/14.3 |
| 1,494,951 | 5/1924 | Cragun | 254/104 |
| 2,733,894 | 2/1956 | Overman | 254/104 |
| D168,534 | 1/1953 | Council | 254/104 |

Primary Examiner—Al Lawrence Smith
Assistant Examiner—Roscoe V. Parker
Attorney, Agent, or Firm—Weingarten, Maxham & Schurgin

[57] ABSTRACT

The present invention provides a strong, but lightweight, multi-function, portable lumbering tool which can be easily carried by an individual lumberjack operating alone in the forest. The tool combines a number of functions which permit an individual lumberjack to fell even large trees in a desired direction including a breaking iron for tipping a tree, a wedge for preventing a saw from binding in a partially cut tree, a hook for dragging and rolling felled logs or for freeing a partially felled tree caught on another tree. The tool may also be used as a spade for clearing around the trunk of a tree or for general purpose digging.

9 Claims, 3 Drawing Figures

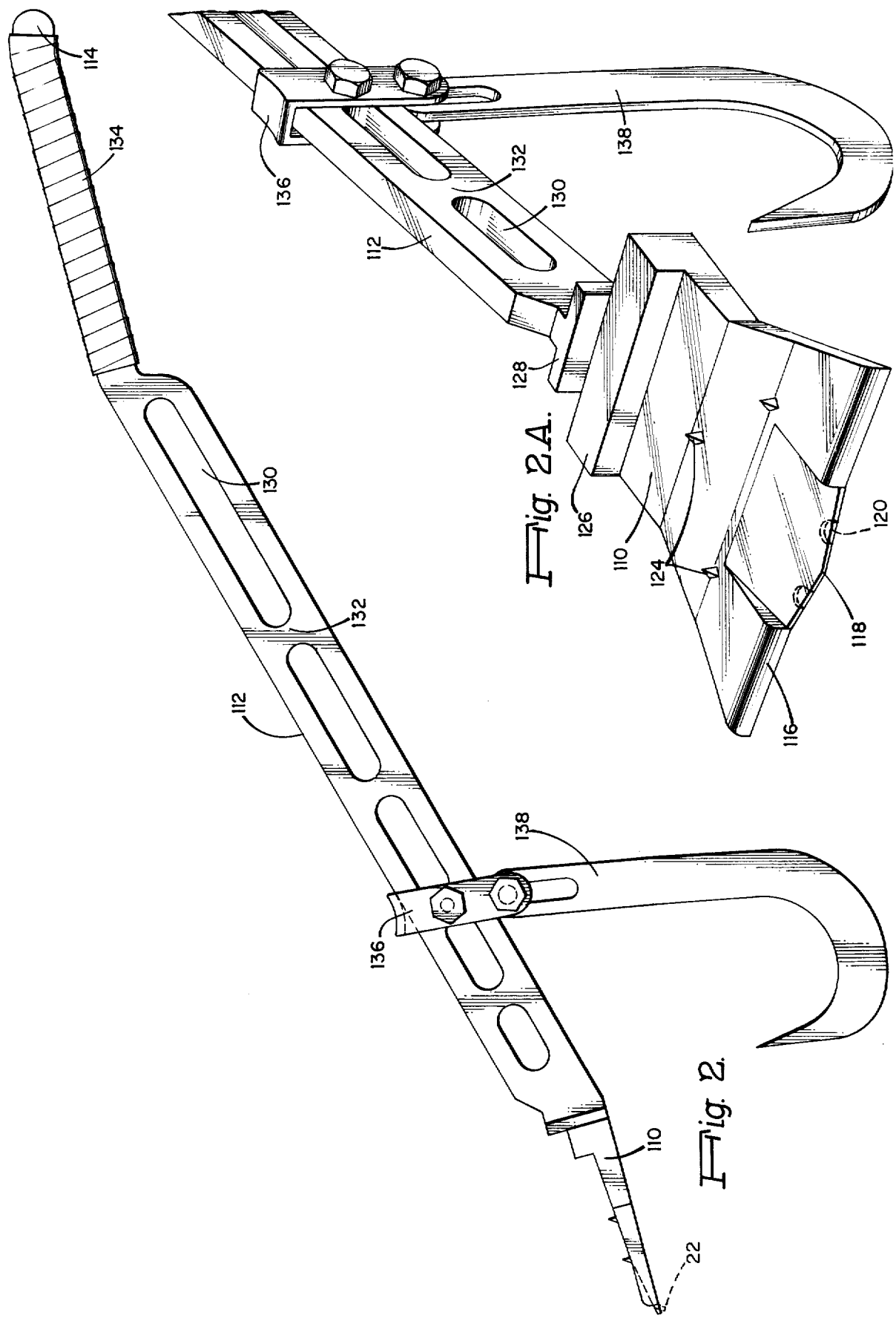

LUMBERING TOOL

FIELD OF THE INVENTION

The present invention relates to lumbering tools and more particularly to portable, manually operable multi-function tools.

BACKGROUND OF THE INVENTION

Lumbering is still often done by an individual lumberjack operating in the forest alone. After they are felled, certain types of trees are cut into pieces and stacked, while others are dragged out in one piece on skidders usually in groups of several trees. It is therefore, important, especially when working alone, that the lumberjack be able to control the direction in which the tree falls to minimize subsequent handling needed to cut, stack or remove felled trees. When "thinning" forests, an individual can fell small trees in a desired direction without appreciable mechanical help. However, if it is necessary to remove much larger trees, a lumberjack will find it virtually impossible to force a tree over without some mechanical aid. In the past, a variety of tools have been used for controlling the direction in which trees fall and for subsequent handling of the trees, i.e. breaking irons or levers for tipping a tree, wedges for preventing a saw from binding, hooks for dragging and rolling logs. These tools are used to forceably tip trees that do not lean in the desired direction and to prevent even straight standing trees from leaning back during or after cutting. It is therefore, important that an individual lumberjack be provided with a light, portable, manually operable multi-purpose tool to eliminate the need for carrying different items each for a single lumbering purpose.

SUMMARY OF THE INVENTION

The present invention provides a strong, but lightweight, multi-function, portable lumbering tool which can be easily carried by an individual lumberjack. The tool combines a number of functions which permit an individual to fell even large trees in a desired direction, including a breaking iron or lever for tipping a tree, a wedge for preventing a saw from binding in a partially cut tree, a hook for dragging and a cant hook for rolling felled logs or for freeing a partially felled tree caught on another tree. The tool may also be used as a spade for clearing around the trunk of a tree or for general purpose digging.

The multi-purpose lumbering tool of the present invention includes a head with a wedge-shaped cross section for insertion into the saw track of a partially cut tree to keep the tree from leaning back on the saw and to help lean the tree in the direction of felling. The head is integrally formed on a shaft with a thicker end of the head contiguous with one end of a shaft. A handle suitable for gripping with both hands is integral with the shaft and is displaced on the other end of the shaft. The handle and shaft act as a lever with the thicker end óf the head serving as a fulcrum for tipping a tree. The head is flared in the plane of the head in a direction transverse to the shaft to provide a large bearing surface for efficient force transmission during tipping of a tree and to minimize sinking of the head into a soft tree trunk.

A portion of the leading edge of the head has a relatively sharp point for biting into the tree stump to hold the tool in place when it is lifted during the tipping process. Small barbs are disposed on one surface of the head for preventing the head from being pressed out of the saw track as the tree sits back on the tool. The shaft may be tapered from a thinner cross section near the handle to a thicker cross section near the head to provide a greater fulcrum for tipping the tree and to add strength to the tool. Portions of the head other than the pointed edge are rounded for safety purposes.

In a preferred embodiment, a hook is provided on one trailing edge of the wedge-shaped head and extends outwardly in the plane of the head. A cooperating support or bracket is integrally disposed on the shaft and transverse thereto midway of the head and handle and in the plane of the head to provide a canting surface cooperative with the hook for rolling a log and also to provide an extra hand grip when the tool is used to hook and drag a log. In an alternative embodiment, the hook can be adjustably affixed to the shaft to provide cant hook and drag hook functions.

The tool is lightweight, weighing only about one pound and easily carried in a hip holster. The convenient length of the shaft makes it easier to reach a log for hooking or dragging and saves the back from unnecessary, excessive bending when rolling a log. Although the tool is only 12 inches long, as a breaking iron it is just as effective as a 18 foot long pole pushing against a 20 inch base diameter tree.

DESCRIPTION OF THE DRAWINGS

The invention will be more fully understood from the following detailed description taken in conjunction with the accompanying drawings in which:

FIG. 2 is an elevation view of an alternative embodiment of the invention; and

FIG. 2A is a partial perspective view of the embodiment of FIG. 2 showing the details of the alternative head construction.

DETAILED DESCRIPTION OF THE INVENTION

Figure 1:
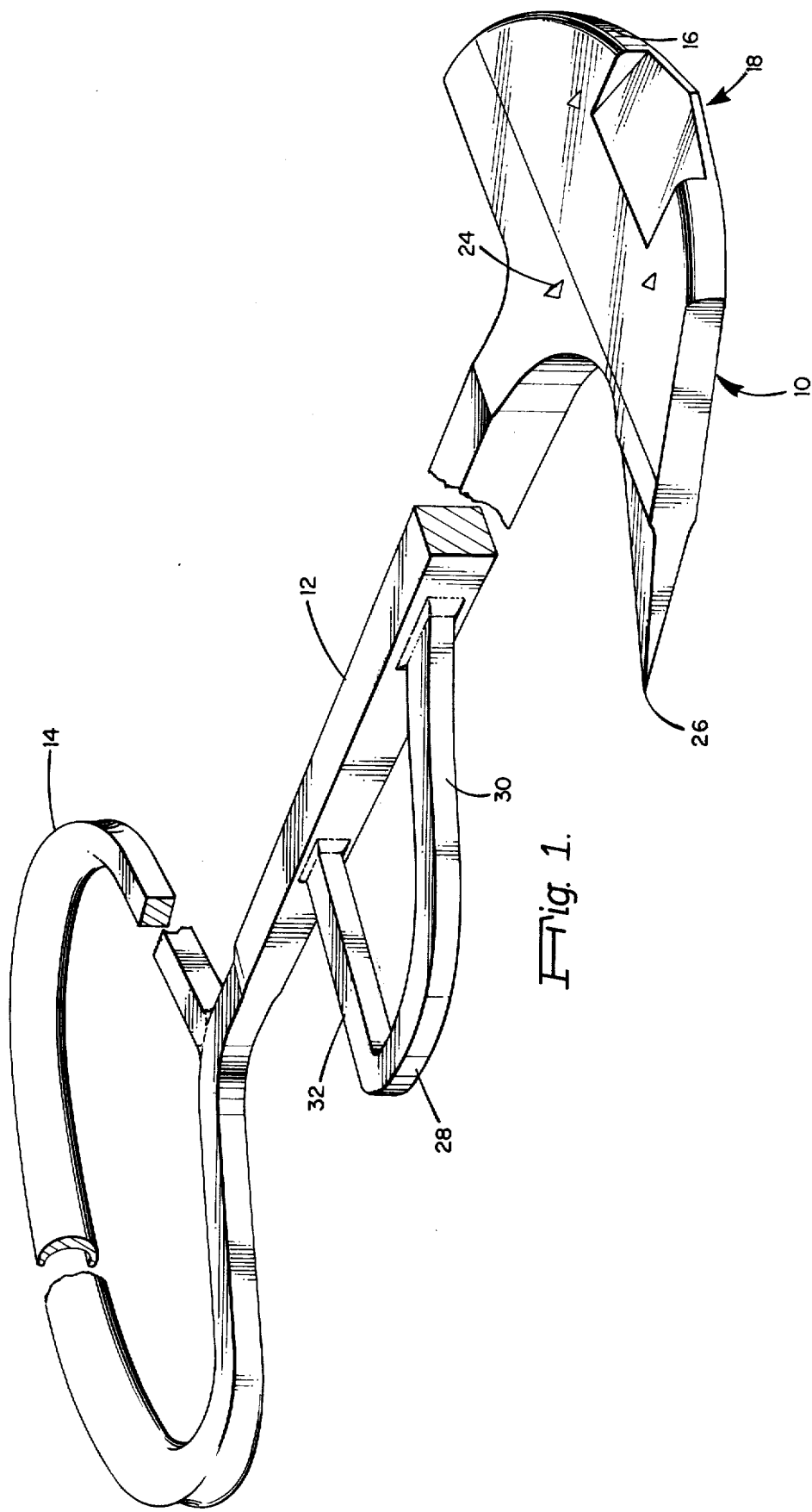
FIG. 1 is a perspective view of the multi-function logging tool of the present invention.

The present invention provides a lightweight, multi-purpose lumbering tool which may function as a lever for tipping trees, as a wedge for keeping a saw track open and to bias a tree in a particular direction for felling, as a hook for dragging logs or as a cant hook for rolling felled logs or for freeing partially felled trees and as a spade. Referring now to FIG. 1, there is shown the novel lumbering tool of the present invention which includes a generally semi-circular head 10 integrally disposed on one end of an elongated shaft 12 and a generally oval-shaped handle 14 integrally disposed on the other end of shaft 12 in the plane of head 10.

Shaft 12 may be tapered from a thin end near handle 14 to a thick end near head 10 both to provide a large fulcrum for tipping the tree and to provide a stronger but lighter weight shaft. Handle 14 may be grooved to reduce its weight. Head 10 has a generally wedge-shaped cross section tapering longitudinally from a thicker end to a thinner end at the leading edge 16 of the tool. Leading edge 16 is rounded along most of the periphery thereof so that it may be easily handled and carried safely.

The wedge-shaped cross section of the head 10 facilitates its insertion into a saw track of a partially cut tree to prevent the saw from binding and to wedge up the tree so that the direction of felling may be controlled. Head 10 flares in the plane of the head in a direction transverse to shaft 12 to provide a large bearing surface for the head against the tree trunk to prevent the head from sinking into a soft trunk when the tree is tipped and to efficiently transmit an operating force during tree tipping. The head is apt to sink into the stump of trees that have grown quickly so that the fibers are soft or generally in the springtime when trees are softer due to high water content. A portion of the leading edge 16 of head 10 has a relatively sharp generally triangular point 18 which is used to bite into the stump and hold the tool in place during lifting and tipping of the tree. The pointed edge 18 also facilitates the insertion of the head into a narrow saw track. For even greater biting effect, especially in winter when the wood is hard, optional small slots 120 may be made in the pointed edge near the point 118 as shown in phantom in FIG. 2A. As shown in phantom in FIG. 2, the tip can optionally include a downwardly bent lip 22 to provide a further biting effect.

One or more small rearwardly pointing barbs 24 are disposed on the upper surface of head 10 to prevent the head from being pressed out of a saw track by the weight of a tree. If the head tends to slip out of a saw track the barbs will engage the wood fibers to hold the head in place. This problem is greatest in the winter when trees are frozen and when the head may be covered with a thin layer of frost or ice.

In operation, head 10 may be impelled into a saw track by kicking the trailing thicker edge of head 10 or by kicking the trailing edge of handle 14. After the tree has been partially tipped with the wedge and notched with a saw, it is ready for felling. Handle 14 may be grasped with both hands and together with shaft 12 acts as a lever for tipping the tree about the fulcrum provided by the thicker end of wedged head 10. The pointed edge 18 bites into the stump and the flared portions of the head rest against the trunk during tipping.

A hook 26 is integrally disposed from the thicker trailing edge of head 10 and tapers in the direction toward handle 14 to a sharp point. A generally triangular slide bracket 28 is integrally disposed on shaft 12 in the plane of head 10 at a predetermined distance between the head and the handle. Bracket 28 includes a canting leg 30 and a gripping leg 32. In operation, the lumberjack may swing the tool, like an ax, to bite hook 26 into a log. The length of the tool is sufficient to reach individual logs after they have been cut so that they may be hooked and dragged. Canting leg 30 of bracket 28 permits the tool to be used as a cant hook for rolling or turning heavy logs on the ground or for releasing partially felled trees caught on another tree. Canting leg 30 keeps the log from touching the shaft so as to provide the hook with the proper angle of attack and grip on the log. The handle leg 32 of bracket 28 provides an extra grip for dragging a heavy log. The length of the shaft makes it easier to reach a log when hooking and saves the back from unnecessary excess bending when rolling a log.

The novel lumbering tool of the present invention can be seen to provide all of the functions of a breaking iron, wedge, hook or cant hook. Furthermore, the tool may be used as a shovel with head 10 functioning as the spade.

The tool is preferably made of a high strength metal and can be forged or otherwise formed in a single piece or made in separate pieces by known techniques and then welded together.

Referring now to FIG. 2A, there is shown an alternative embodiment of the lumbering tool of the present invention, including a generally rectangular head 110 integrally disposed on one end of an elongated shaft 112 and an elongated handle 114 integrally disposed on the other end of the shaft 112. Head 110 has a generally wedge-shaped cross section tapering longitudinally from a thick end adjacent shaft 112 to a thin end at the leading edge 116 of the tool. A portion of leading edge 116 is rounded for safety. The central portion of the leading edge has a relatively sharp generally triangular point 118 for biting into a tree stump as in FIG. 1. Alternatively, slots 120 may be provided to increase the biting effect into hard or frozen wood. As in FIG. 2, a lip may be provided on pointed edge 118. One or more barbs 124 are provided to prevent the head from being pressed out of a saw track. The front of head 110 flares in the plane of the head and transverse to shaft 112 in order to provide a greater bearing surface for the head against a trunk of a tree.

A heel section 126 of substantially increased thickness is provided on the thick end of head 110. Heel 126 is used for "repeating" whereby the tree can be wedged up and maintained in a forwardly leaning position. One first tips the tree as far as possible and then sticks in the heel to keep it up. The lumberjack then saws off most of the hinge which offers resistance to felling. Some of the hinge must always be left to help steer the tree in the proper direction. Since the tree and the head are pivoted with different radii during tipping of the tree, the length of head 110 must be sufficient to allow room for the tree to slide along the face of the head without interference with heel 126. Such interference would force the head out of engagement with the trunk and thereby impede felling.

Shaft 112 terminates in a t-shaped expansion 128 to provide a larger area of contact between the shaft 112 and head 110 and a larger weld area. However, it is possible to make the head and shaft from one piece without welding, for example, by forging.

The weight of shaft 112 may be reduced by providing cutouts 130 leaving supporting ribs 132. The ribs are spaced closely together at the end of shaft 112 near head 110 because that is where the stress is highest and are spaced farther apart near handle 114. Handle 114 may be fashioned from an I beam to further reduce the weight of the tool without sacrificing strength. Handle 114 may be covered with a plastic or rubber grip 134 for added comfort. Handle 114 may be disposed at a small angle, i.e. 22°, with respect to the longitudinal axis of the shaft in one direction and the head may be disposed at a somewhat smaller angle, i.e. 15°, with respect to the longitudinal axis of the shaft in the opposite direction to provide added leverage for the user when tipping a tree.

A strap 136 is pivotally disposed on shaft 112 in a direction perpendicular to the plane of head 110. A hook 138 is, in turn, pivotally and reversibly secured to the lower end of strap 136. When hook 138 is disposed with its point toward head 110, the tool of this embodiment may be used as a cant hook for rolling a heavy log wherein the bottom face of head 110 rests against the top of the log and the hook bites into the bottom of the log and the user rolls the log by pushing up on handle 114. Alternatively, when the hook is pointed away from the head, the tool may be used as a hook for dragging logs along the ground. The tool may also be used as a shovel.

Those skilled in the art will appreciate the various modifications that may be made to the previously described embodiments of the lumbering tool of the present invention without varying from the scope of the present invention. Consequently, it is not intended that the present invention be limited by what has been particularly shown and described, except as indicated in the appended claims.

What is claimed is:

1. A unitary portable, multi-function lumbering tool comprising:

an elongated shaft;

a head integrally disposed on one end of said shaft and having a wedge-shaped cross section tapering longitudinally from said shaft to a leading edge to facilitate its insertion into a saw track of a partially cut tree and to prevent a saw from binding therein, said head including a flared section extending in the plane of said head in a direction transverse to said shaft to provide a larger bearing surface for the head against a tree trunk;

at least one pointed edge projecting from a portion of said leading edge of said head for biting into a tree;

one or more rearwardly facing barbs disposed on one surface of said head for preventing said head from being pressed out of said saw track under the weight of the tree;

a handle integrally disposed at the other end of and cooperative with said shaft to provide a lever for tipping the tree about a fulcrum provided by the thicker end of said head; and a hook disposed with respect to said head and cooperative with a surface of said tool to provide canting functions.

2. A lumbering tool as in claim 1 further including:

a transverse surface at the thicker end of said head to provide a means for impelling the head into a saw track.

3. A lumbering tool as in claim 1 wherein said handle includes a generally oval-shaped grooved perimeter extending transverse to the shaft and in the plane of the head suitable for gripping with one or both hands, the outermost surface of said handle providing a means for impelling said head into a saw track.

4. A lumbering tool as in claim 1 wherein said hook is tapered to a sharp point and integrally disposed on and extending from said thicker end of said head.

5. A lumbering tool as in claim 1 wherein said shaft is tapered from a relatively thin cross section at said handle end to a relatively thick cross section at said head end to provide a larger fulcrum for tipping the tree and to provide a stronger shaft.

6. A lumbering tool as in claim 4 further including a bracket integrally disposed on and extending transversely from the shaft in the plane of said head at a predetermined distance from said hook and operative to provide a canting surface cooperative with said hook for rolling a log.

7. A lumbering tool as in claim 1 further including a generally rectangular heel disposed at the thick end of said wedged head for providing a raised platform on which a partially tipped tree may rest to prevent the tree from leaning back after it has been partially tipped; the longitudinal length of said head being sufficient to allow the tree to slide along the face of said head as it is being tipped until it begins to fall without interference with said heel.

8. A unitary, portable, multi-function lumbering tool comprising:

an elongated shaft tapering from a relatively thick cross section at one end to a relatively thin cross section at the other end;

a head integrally disposed on said thicker end of said shaft and having a wedge-shaped cross section tapering longitudinally from said shaft to a leading edge of the tool to facilitate its insertion into a saw track of a partially cut tree and to prevent a saw from binding therein, said head including a flared section extending in the plane of said head in a direction transverse to said shaft to provide a larger bearing surface for said head against a tree trunk;

at least one pointed edge projecting from a portion of said leading edge of said head for biting into a tree;

one or more rearwardly facing barbs disposed on one surface of said head for preventing said head for being pressed out of a saw track under the weight of the tree;

a transverse surface at the thicker end of said head to provide a means for impelling the head into a saw track;

a hook tapered to a sharp point and integrally disposed on and extending from a corner of said thicker end of said head;

a bracket integrally disposed on and extending transversely from said shaft in the plane of said head at a predetermined distance from said hook and operative to provide a canting surface cooperative with said hook for rolling a log;

a handle integrally disposed at the thinner end of said shaft and including a generally oval-shaped grooved perimeter extending transversed to the shaft in the plane of the head suitable for gripping with one or both hands and having an outwardly facing rear surface for providing means for impelling said head into a saw track, said handle and said shaft cooperative to provide a lever for tipping the tree about a fulcrum provided by the thicker end of said head.

9. A unitary, portable, multi-function lumbering tool comprising:

an elongated shaft having a plurality of longitudinal cutouts therethrough to reduce its weight separated by transverse ribs, said ribs being spaced closer together toward a first end of said shaft and farther apart toward a second end of said shaft;

a head integrally disposed on said first end of said shaft and having a wedge-shaped cross section tapering longitudinally from said shaft to a leading edge to facilitate its insertion into a saw track of a partially cut tree and to prevent a saw from binding therein said head including a flared section extending in the plane of said head in a direction transverse to said shaft to provide a larger bearing surface for the head against a tree trunk;

at least one pointed edge projecting from a portion of said leading edge of said head for biting into a tree;

one or more rearwardly facing barbs disposed on one surface of said head for preventing said head from being pressed out of a saw track under the weight of the tree;

a heel disposed at the thick end of said head for providing a raised platform on which a partially tipped tree may rest to prevent the tree from leaning back after it has been partially tipped;

the longitudinal length of said head being sufficient to allow the tree to slide along the face of said head as it is being tipped until it begins to fall without interference with said heel;

a handle formed of an I beam and integrally disposed at the second end of and cooperative with said shaft to provide a lever for tipping the tree about a fulcrum provided by the heel;

a strap pivotally disposed on said shaft;

a hook pivotally and reversibly disposed on said strap in a plane perpendicular to that of said head for providing, when said hook is pointed toward said head, a cant hook for rolling a log, and when said hook is pointed toward said handle for providing a hook for dragging a log.

* * * * *